US010008728B2

(12) United States Patent
Kizaki

(10) Patent No.: US 10,008,728 B2
(45) Date of Patent: Jun. 26, 2018

(54) FUEL CELL SYSTEM AND MOBILE ARTICLE

(75) Inventor: Mikio Kizaki, Toyoake (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1797 days.

(21) Appl. No.: 12/084,431

(22) PCT Filed: Dec. 1, 2006

(86) PCT No.: PCT/JP2006/324494
§ 371 (c)(1),
(2), (4) Date: May 1, 2008

(87) PCT Pub. No.: WO2007/072693
PCT Pub. Date: Jun. 28, 2007

(65) Prior Publication Data
US 2009/0142633 A1 Jun. 4, 2009

(30) Foreign Application Priority Data

Dec. 19, 2005 (JP) ................. 2005-365392

(51) Int. Cl.
*H01M 8/04119* (2016.01)
*B60L 11/18* (2006.01)
*H01M 8/04492* (2016.01)
*H01M 8/04828* (2016.01)

(52) U.S. Cl.
CPC ..... *H01M 8/04156* (2013.01); *B60L 11/1885* (2013.01); *B60L 11/1892* (2013.01); *H01M 8/04492* (2013.01); *H01M 8/04843* (2013.01); *H01M 2250/20* (2013.01); *Y02T 90/32* (2013.01); *Y02T 90/34* (2013.01)

(58) Field of Classification Search
CPC .......... H01M 8/04298; H01M 8/4156; H01M 8/4179
USPC ...................................... 429/414
See application file for complete search history.

(56) References Cited

U.S. PATENT DOCUMENTS

| 2001/0016276 A1* | 8/2001 | Yamanashi ......... B60L 11/1881 429/431 |
| 2005/0266284 A1* | 12/2005 | Scharf ............... H01M 8/04089 429/410 |
| 2007/0026277 A1* | 2/2007 | Ogawa .............. H01M 8/04007 429/408 |
| 2007/0092771 A1* | 4/2007 | Wake et al. ..................... 429/22 |

FOREIGN PATENT DOCUMENTS

| JP | 2001-256988 A | 9/2001 |
| JP | 2002-373688 A | 12/2002 |
| JP | 2004-119052 A | 4/2004 |
| JP | 2004-158274 A | 6/2004 |

(Continued)

*Primary Examiner* — Ula C Ruddock
*Assistant Examiner* — Thomas H. Parsons
(74) *Attorney, Agent, or Firm* — Hunton Andrews Kurth LLP

(57) ABSTRACT

A fuel cell system, which includes a fuel cell for generating electric power and which discharges externally water remaining in the fuel cell by supplying a gas to the fuel cell, includes discharge amount estimating means, for estimating, based on the state of the fuel cell (the amount of residual water or an inclination angle), the amount of water to be discharged from the fuel cell.

9 Claims, 6 Drawing Sheets

(56) References Cited

FOREIGN PATENT DOCUMENTS

| JP | 2004158274 | * | 6/2004 | ............. H01M 8/04 |
|----|------------|---|--------|-------------------------|
| JP | 2004-192973 A | | 7/2004 | |
| JP | 2004-207139 A | | 7/2004 | |
| JP | 2005-141940 A | | 6/2005 | |
| JP | 2005-222854 A | | 8/2005 | |
| JP | 2005216626 | * | 8/2005 | |
| JP | 2005-276757 A | | 10/2005 | |
| JP | 2006-19184 A | | 1/2006 | |

* cited by examiner

Fig. 2

| RESIDUAL WATER AMOUNT (g/cell) | $W_1$ | $W_2$ | $W_3$ | $W_4$ |
|---|---|---|---|---|
| WATER DISCHARGE AMOUNT (g) | $Q_1$ | $Q_2$ | $Q_3$ | $Q_4$ |

| FUEL CELL INCLINATION ANGLE (°) | $-\theta_3$ | $-\theta_2$ | $-\theta_1$ | 0 | $-\theta_1$ | $-\theta_2$ | $-\theta_3$ |
|---|---|---|---|---|---|---|---|
| WATER DISCHARGE AMOUNT (g) | $Q_{11}$ | $Q_{12}$ | $Q_{13}$ | $Q_{14}$ | $Q_{15}$ | $Q_{16}$ | $Q_{17}$ |

$$|\theta_1| < |\theta_2| < |\theta_3|$$

$$Q_{17} < Q_{16} \cdots < Q_{11}$$

FUEL CELL SYSTEM AND MOBILE ARTICLE

This is a 371 national phase application of PCT/JP2006/324494 filed 1 Dec. 2006, which claims priority of Japanese Patent Application No. 2005-365392 filed 19 Dec. 2005, the contents of which are incorporated herein by reference.

TECHNICAL FIELD

The present invention relates to a fuel cell system and a mobile article.

BACKGROUND ART

At present, a fuel cell system, which includes a fuel cell that generates electric power upon receiving source gases (a fuel gas and an oxidizing gas), has been proposed and put into practical use. When electric power is generated by this fuel cell system, water is generated inside the fuel cell by an electrochemical reaction; however, there is a case in which water is retained in the source gas passage of the fuel cell and blocks the inflow of source gas. Further, when the fuel cell system is to be operated in a low-temperature environment, such as a below-zero environment, there is a case wherein water retained in the electrodes (a catalyst layer and a diffusion layer) of the fuel cell is frozen and sharply deteriorates the starting function.

As prior art that resolves the above described variety of problems that occur due to the water generated inside a fuel cell, a technique (a scavenging technique) has been proposed whereby, when the operation of a fuel cell is halted, dry oxygen or dry hydrogen is supplied to a source gas passage, thereby removing any water remaining in the fuel cell. Furthermore, recently, a technique has been proposed whereby a calculation is performed to determine the balance of the water remaining in a fuel cell, and based on the thus obtained water balance, the flow rate of gas to be supplied to the fuel cell is increased or decreased to adjust the internal moisture state of the fuel cell (see, for example, Japanese Patent Application Laid-Open No. 2004-119052).

DISCLOSURE OF THE INVENTION

Incidentally, in order to start a fuel cell in a low-temperature environment, the amount of water in the fuel cell must be equal to or smaller than a predetermined permissible value (the amount of water to enable starting). And in order to obtain an amount of water in the fuel cell equal to or smaller than such a predetermined permissible value, the exact amount of water discharged from the fuel cell must be calculated (estimated) and the internal moisture state of the fuel cell must be accurately determined.

According to the technique described in the above described publication, the amount of water to be discharged from the fuel cell is calculated based, for example, on the flow rate of the gas supplied to the fuel cell; however, a problem exists in that an accurate amount of water to be discharged can not be calculated, at this time, because the state of the fuel cell (e.g., the amount of residual water in the fuel cell and the inclination of the fuel cell) is not taken into account. When the amount of water to be discharged from the fuel cell can not be precisely calculated (estimated) as described, the starting function of the fuel cell might be deteriorated in a low-temperature environment.

The present invention is provided while taking these situations in consideration, and one objective of the invention is to provide a fuel cell system that can accurately estimate, based on the state of a fuel cell, the accurate amount of water to be discharged from the fuel cell.

In order to achieve the above described objective, a fuel cell system according to the present invention, which includes a fuel cell for generating electric power and which discharges externally water remaining in the fuel cell by supplying a gas to the fuel cell, comprises: discharge amount estimating means for estimating, based on the state of the fuel cell, the amount of water to be discharged from the fuel cell.

For example, based on the amount of water remaining in the fuel cell, the discharge amount estimating means can estimate the amount of water that is to be discharged from the fuel cell. Also, based on a state wherein the fuel cell is inclined or a state wherein a force is applied to the fuel cell, the discharge amount estimating means can estimate what amount of water is to be discharged from the fuel cell.

According to this arrangement, the amount of water to be discharged from the fuel cell can be accurately estimated by taking the state of the fuel cell (e.g., the amount of water remaining in the fuel cell or the tilt of the fuel cell) into account. For example, in a case wherein a large (small) amount of water remains in the fuel cell, it can be estimated that a large (small) amount of water is to be discharged from the fuel cell. Furthermore, since a proportional relationship is not always established between the amount of water remaining in the fuel cell and the amount to be discharged, a relationship between the amount of water remaining and the amount to be discharged should be designated for each fuel cell, and a correction should be performed based on this relationship, so that the amount of water to be discharged can be precisely estimated. In addition, in a case wherein the discharging of water from the fuel cell becomes easy (or difficult) because the fuel cell is inclined or an inertial force is applied to the fuel cell, it can be estimated that the amount of water to be discharged from the fuel cell will be increased (decreased). Therefore, since the internal moisture state of the fuel cell can be precisely determined, this can contribute to an improvement in the starting function of the fuel cell in a low-temperature environment, and the amount of fuel consumed can be reduced.

Further, a mobile article according to the present invention comprises the above described fuel cell system.

Since this arrangement includes a fuel cell system that can employ the state of a fuel cell to accurately estimate the amount of water to be discharged from a fuel cell, a mobile article can be provided that exhibits a superior starting function in a low-temperature environment, and that can reduce the amount of fuel consumed.

According to the present invention, a fuel cell system can be provided that can employ the state of a fuel cell to accurately estimate the amount of water to be discharged from the fuel cell.

BRIEF DESCRIPTION OF THE DRAWINGS

FIG. 2 is a table map representing a relationship between the amount of residual water in the fuel cell, of the fuel cell system shown in FIG. 1, and an amount of water to be discharged from the fuel cell;

FIG. 5 is a table map representing a relationship between the inclination angle of the fuel cell, of the fuel cell system according to the second mode of the present invention, and the amount of water to be discharged from the fuel cell.

BEST MODES FOR CARRYING OUT THE INVENTION

A fuel cell system 1 according to the modes of the present invention will now be described while referring to drawings. For the modes of the invention, a description will be given for an example wherein the present invention is applied for an on-board power generating system in a fuel cell hybrid vehicle S (a mobile article).

<First Mode>

Figure 1:
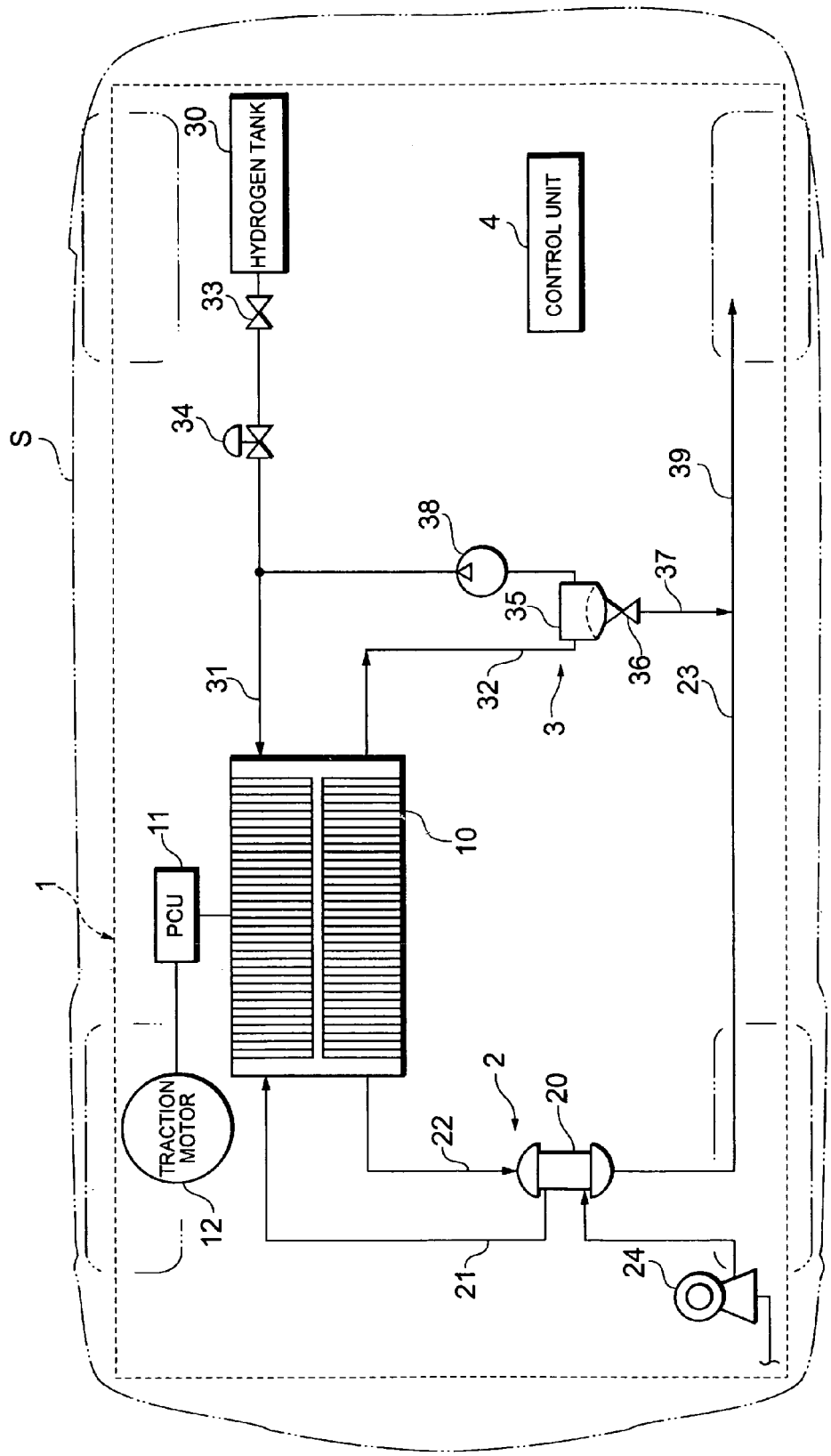
FIG. 1 is a diagram illustrating the configuration of a fuel cell system according to a first mode of the present invention.
Figure 3:
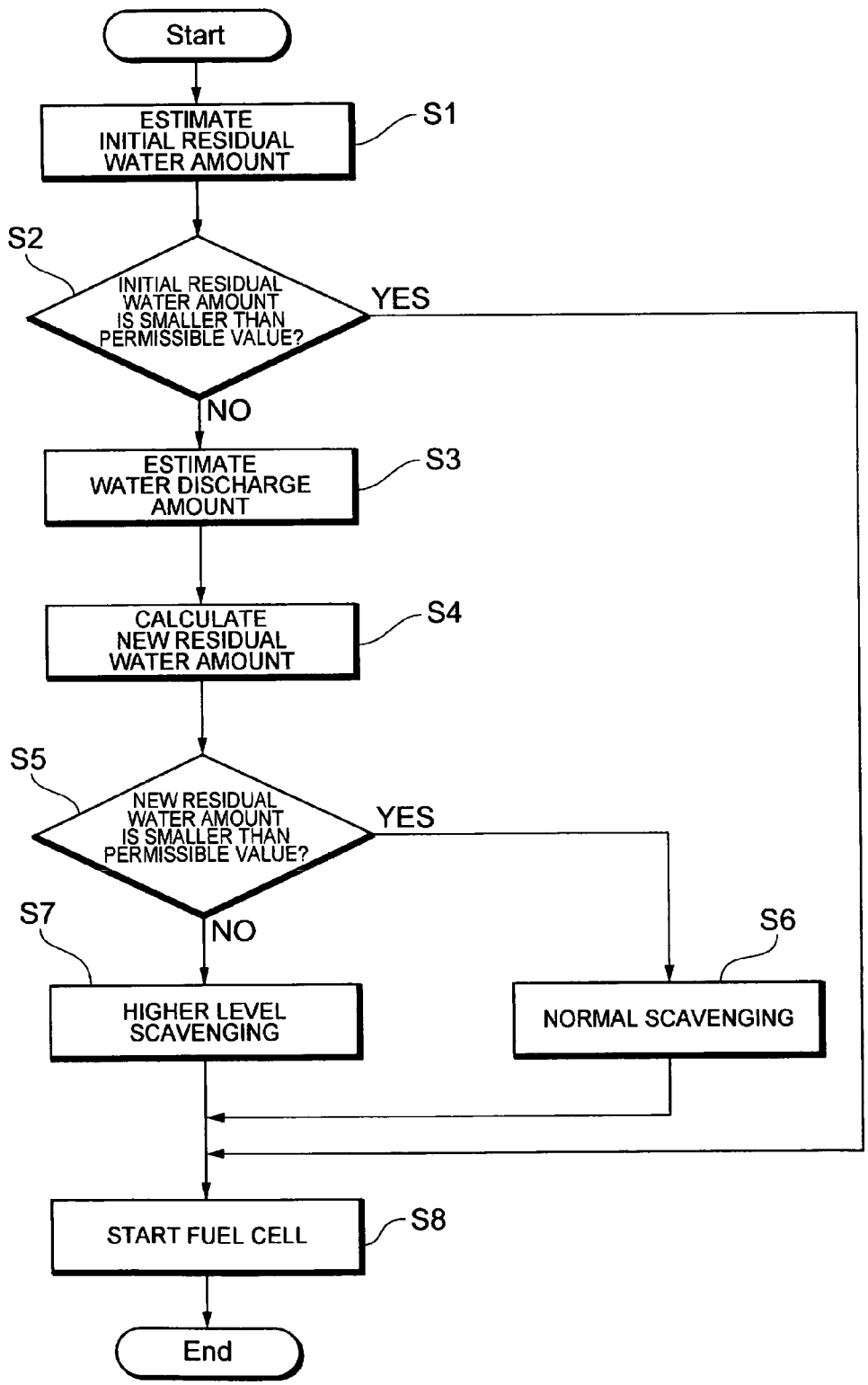
FIG. 3 is a flowchart for explaining a method for starting the fuel cell system in FIG. 1.

A fuel cell system 1 according to a first mode of the present invention will now be described while referring to FIGS. 1 to 3. As shown in FIG. 1, the fuel cell system 1 according to this mode includes: a fuel cell 10 that generates electric power upon receiving source gases (an oxidizing gas and a fuel gas); an oxidizing gas piping system 2, which supplies air as an oxidizing gas to the fuel cell 10; a hydrogen gas piping system 3, which supplies hydrogen gas as a fuel gas to the fuel cell 10; and a control unit 4 which controls the overall system.

The fuel cell 10 has a stack structure provided by laminating a predetermined number of electric cells that generate electric power upon receiving source gases. Electric power generated by the fuel cell 10 is supplied to a PCU (Power Control Unit) 11. The PCU 11 includes an inverter, a DC-DC converter, etc., which are arranged between the fuel cell 10 and a traction motor 12.

The oxidizing gas piping system 2 includes an air supply passage 21 for supplying, to the fuel cell 10, an oxidizing gas (air) that has been humidified by a humidifier 20; an air discharge passage 22 for introducing, to the humidifier 20, an oxidizing off-gas discharged from the fuel cell 10; and an exhaust passage 23 for introducing the oxidizing off-gas from the humidifier 20 to the outside. A compressor 24, for fetching an oxidizing gas contained in the air and transmitting the gas to the humidifier 20 under pressure, is located along the air supply passage 21. The operation of the compressor 24 is controlled by the control unit 4.

The hydrogen piping system 3 includes: a hydrogen tank 30, which serves as a fuel supply source in which high-pressure hydrogen gas is stored; a hydrogen supply passage 31, for supplying hydrogen gas from the hydrogen tank 30 to the fuel cell 10; and a circulating passage 32, for returning, to the hydrogen supply passage 31, a hydrogen off-gas that is discharged from the fuel cell 10. It should be noted that a reforming device, which generates a hydrogen-rich reformed gas using a hydrocarbon fuel, and a high-pressure gas tank, in which the reformed gas generated by the reforming device is stored under high pressure, may be employed as a replacement fuel supply source for the hydrogen tank 30. Furthermore, a tank containing a hydrogen-occluding alloy may be employed as a fuel supply source.

A shut-off valve 33, which blocks or permits the supply of hydrogen gas from the hydrogen tank 30, and a regulator 34, which adjusts the pressure of hydrogen gas, are provided along the hydrogen supply passage 31. In this mode, an adjustable pressure type regulator 34, for which a target value for a pressure to be supplied can be changed by a step motor, is employed. The operations of the shut-off valve 33 and the regulator 34 are controlled by the control unit 4.

A discharge passage 37 is connected to the circulating passage 32 via a gas-liquid separator 35 and an exhaust/drain valve 36. The gas-liquid separator 35 collects water from the hydrogen off-gas. The exhaust/drain valve 36 is to be operated in accordance with an instruction issued by the control unit 4, and externally discharges (purges) water collected by the gas-liquid separator 35 and hydrogen off-gas that remains in the circulating passage 32 and contains an impurity. In addition, a hydrogen pump 38 is provided along the circulating passage 32 to transfer hydrogen off-gas in the circulating passage 32 to the hydrogen supply passage 31 under pressure. It should be noted that the gas in the discharge passage 37 is attenuated by an attenuating device (not shown) so that the gas merges, at a discharge pipe 39, with a gas in the exhaust passage 23.

The control unit 4 detects a manipulated quantity for an acceleration controller (an accelerator, etc.) mounted in the fuel cell hybrid vehicle S, and controls the operation of various devices in the system upon receiving control information, such as an acceleration request value (e.g., the amount of electric power requested for generation by a load device, such as the traction motor 12). It should be noted that a load device is a general term for power consuming devices, including not only the traction motor 12 but also auxiliary equipment (e.g., motors for the compressor 24, the hydrogen pump 38 and a cooling pump), actuators employed by various devices (a gearbox, a wheel controller, a steering gear, a suspension system, etc.) related to the travel of the fuel cell hybrid vehicle S, an air conditioning system (an air conditioner) used for occupant space, lights and an audio system.

The control unit 4 is constituted by a computer system (not shown). This computer system includes a CPU, a ROM, a RAM, an HDD, an input/output interface and a display device. When the CPU reads and executes various control programs stored in the ROM, various control operations are performed.

Specifically, the control unit 4 supplies gas (an oxidizing gas and a hydrogen gas) to the fuel cell 10 by driving the compressor 24, the shut-off valve 33 and the regulator 34, and performs "scavenging" for externally removing water from the fuel cell 10. When scavenging is to be performed, the control unit 4 temporarily reduces or halts the humidifying of an oxidizing gas using the humidifier 20. It should be noted that the control unit 4 of this mode is supposed to perform scavenging, regardless of whether the operation of the fuel cell 10 is halted (whether power generation is halted), or purging is performed during the operation of the fuel cell 10 (a gas in the circulating passage 32 is being discharged).

Furthermore, based on the amount of water remaining in the fuel cell 10, the control unit 4 estimates the amount of water that is to be discharged from the fuel cell 10 when scavenging is performed. That is, the control unit 4 serves as an example for the discharge amount estimating means, according to the present invention. For example, in a case wherein the amount of water remaining in the fuel cell 10 is "$W_1$", based on a map illustrated in FIG. 2, the control unit 4 estimates the amount of water to be discharged from the fuel cell 10 is "$Q_1$". Similarly, in a case wherein the amount of water remaining in the fuel cell 10 is "$W_4$ ($>W_1$)", the control unit 4 estimates that the amount of water to be discharged from the fuel cell 10 is "$Q_4$ ($>Q_1$)". That is, as there is a large amount of water residual in the fuel cell 10, the control unit 4 estimates that the amount of water to be discharged from the fuel cell 10 is increased.

It should be noted that the control unit 4 employs, for example, a change in the weight of the fuel cell 10 to estimate the amount of water (the initial amount of residual water) that remains in the fuel cell 10 at the initial control stage. Then, based on the map in FIG. 2, the amount of water to be discharged, which corresponds to the initial amount of residual water, is estimated and is subtracted from the initial amount of residual water, so that a new amount of water remaining (a new amount of residual water) is obtained. Thereafter, a new amount of water to be discharged, which corresponds to the new amount of residual water, is estimated based on the map in FIG. 2. By performing the same process, a calculation for the latest amount of residual water and an estimation for the latest amount of water to be discharged are performed.

Next, a method for starting the fuel cell system 1 according to this mode will now be described by employing the flowchart in FIG. 3.

During normal operation of the fuel cell system 1, hydrogen gas is supplied from the hydrogen tank 30, along the hydrogen supply passage 31, to the fuel electrode of the fuel cell 10, while air, for which the humidity has been adjusted, is supplied to the oxidation electrode of the fuel cell 10 along the air supply passage 21, and electric power is generated. At this time, the electric power (requested electric power) to be supplied by the fuel cell 10 is calculated by the control unit 4, and in accordance with the quantity of electric power obtained, a blend of corresponding amounts of hydrogen gas and air is supplied to the fuel cell 10. Since during normal operation the operating state of the fuel cell 10 is wet, water is retained in the fuel cell 10 when the operation is halted. Therefore, in this mode, scavenging should be performed after normal operation has been halted and before the fuel cell 10 is started, and at the time scavenging is performed, an estimation of the amount of water to be discharged is made.

That is, first, based on a change in the weight of the fuel cell 10, etc., the control unit 4 of the fuel cell system 1 estimates the amount of water (the initial amount of residual water) that remains in the fuel cell 10 at the initial control stage (initial residual water amount estimating step: S1). Sequentially, the control unit 4 determines whether the initial amount of residual water is smaller than a predetermined permissible value (an amount of residual water such that the fuel cell 10 can be started) (initial residual water amount determining step: S2), and in a case wherein it is determined that the initial amount of residual water is smaller than the permissible value, the fuel cell 10 is started, without performing scavenging (starting step: S8).

On the other hand, in a case wherein, at the initial residual water amount determining step: S2, the control unit 4 has determined that the initial amount of residual water is equal to or greater than the permissible value, the control unit 4 employs the map in FIG. 2 to estimate what amount of water is to be discharged in consonance with the initial amount of residual water that was estimated at the initial residual water amount estimating step S1 (discharge amount estimating step: S3). For example, in a case wherein the initial amount of residual water is "$W_3$", the amount of water to be discharged is estimated to be "$Q_3$".

Following the discharge amount estimating step S3, the control unit 4 subtracts the amount of water to be discharged ($Q_3$), which was estimated at the discharge amount estimating step S3, from the initial amount of residual water ($W_3$) that was estimated at the initial residual water amount estimating step S1, and obtains a new value for the amount of water that remains in the fuel cell 10 (new amount of residual water: "$W_3-Q_3$") (new residual water amount calculating step: S4). Then, the control unit 4 determines whether the new amount of residual water is smaller than the predetermined permissible value (new residual water amount determining step: S5).

In a case wherein, at the new residual water amount determining step S5, the control unit 4 has determined that the new amount of residual water is smaller than the permissible value, the control unit 4 performs normal scavenging (normal scavenging step: S6), and starts the fuel cell 10 (starting step: S8). On the other hand, in a case wherein the control unit 4 has determined at the new residual water amount determining step S5 that the new amount of residual water is equal to or greater than the permissible value, the control unit 4 performs scavenging at a higher level than normal (higher level scavenging step: S7), and thereafter starts the fuel cell 10 (starting step: S8).

According to the fuel cell system 1 of the above described mode, the amount of water to be externally discharged from the fuel cell 10 can be accurately estimated while taking into account the state of the fuel cell 10 (the amount of water remaining in the fuel cell 10), and in a case wherein a large (small) amount of water remains in the fuel cell 10, it can be estimated that the amount of water to be discharged from the fuel cell 10 will also be increased (reduced). At this time, a proportional relationship is not always established between the amount of water remaining in the fuel cell 10 and the amount of water discharged, and the amount of water to be discharged can be accurately estimated based on the relationship shown in FIG. 2 of the amount of residual water and the amount of discharged water. Therefore, since the correct moisture condition of the fuel cell 10 can be obtained, this can contribute to the improvement of the starting function of the fuel cell 10 in a low-temperature environment, and can prevent the performance of unnecessary scavenging and reduce the amount of fuel (hydrogen gas) that is consumed.

Furthermore, since the fuel cell hybrid vehicle S (mobile article) according to the above described mode includes the fuel cell system 1 that can accurately estimate, based on the state of the fuel cell 10, the amount of water to be discharged from the fuel cell 10, a superior starting performance can be exhibited in a low-temperature environment, and the amount of fuel consumed can be reduced.

<Second Mode>

Figure 6:
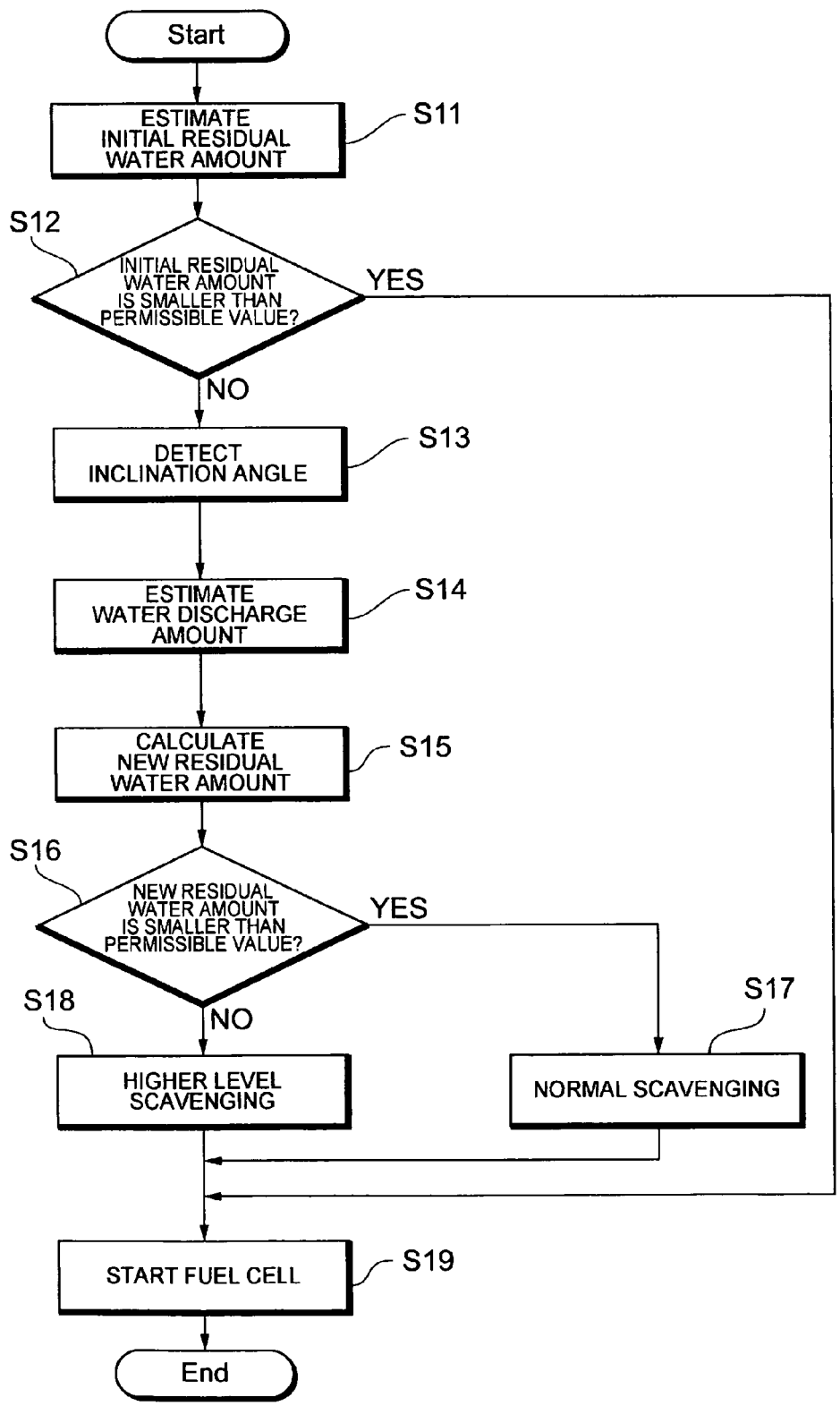
FIG. 6 is a flowchart for explaining a method for starting the fuel cell system according to the second mode of the present invention.

Next, a fuel cell system according to a second mode of the present invention will be described while referring to FIGS. 4 to 6. The fuel cell system according to this mode employs a modification of the arrangement (function) of the control unit of the fuel cell system 1 according to the first mode, and the remainder of the arrangement is substantially the same as that for the first mode. Therefore, the modified portion of the arrangement will mainly be described, while no description will be given for the portions used in common with the first mode by providing corresponding numerals.

Figure 4A:
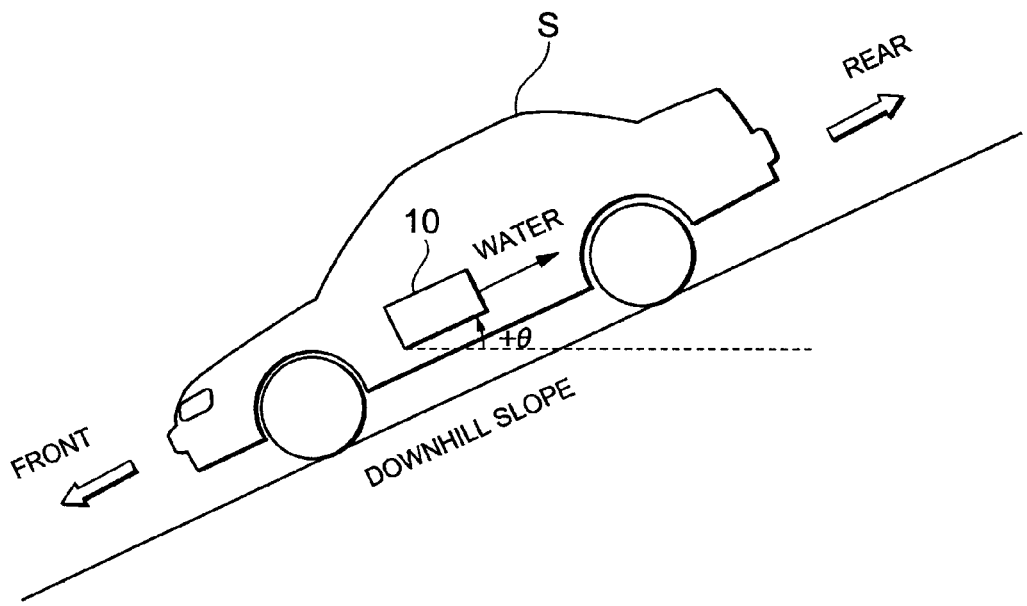
FIG. 4A is a conceptual diagram illustrating the state wherein a fuel cell hybrid vehicle that comprises a fuel cell system according to a second mode of the present invention is stopped on a downhill slope.
Figure 4B:
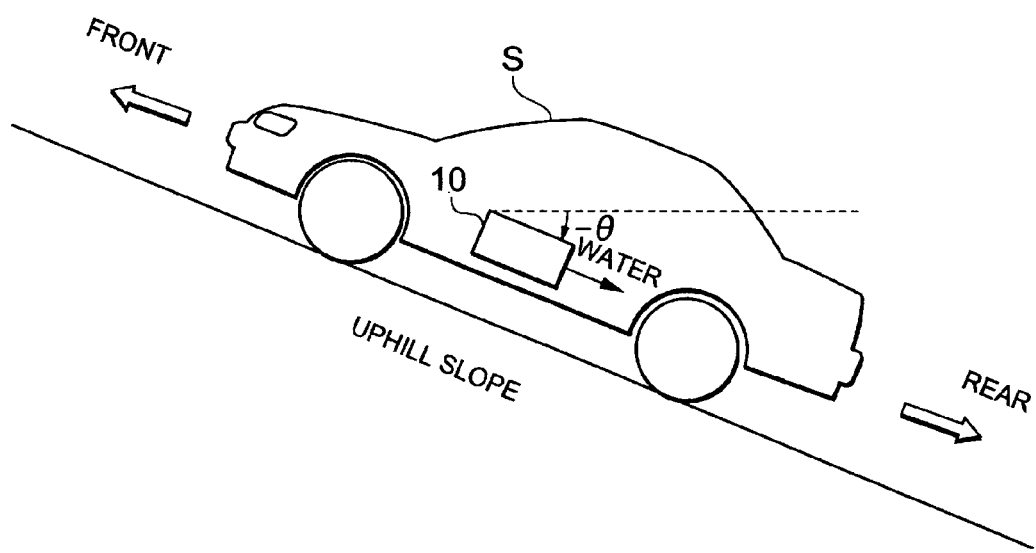
FIG. 4B is a conceptual diagram illustrating the state wherein the fuel cell hybrid vehicle that comprises the fuel cell system according to the second mode of the present invention is stopped on an uphill slope.

In the fuel cell system according to this mode, a fuel cell 10 is fixed to a vehicle body in a state wherein the fuel cell 10 is longitudinally positioned, almost in the center of a fuel cell hybrid vehicle S illustrated in FIG. 4. And the internal gas passage for the fuel cell 10 is formed so as to be substantially horizontal in a case wherein the fuel cell hybrid vehicle S is traveling horizontally, and an outlet for water that flows along the gas passage is arranged at the rear of the fuel cell 10. Therefore, when the fuel cell hybrid vehicle S is traveling along a downhill slope, as shown in FIG. 4A, the fuel cell 10 is inclined so that the water outlet position is higher than the front, and when the fuel cell hybrid vehicle S is traveling along an uphill slope, as shown in FIG. 4B, the fuel cell 10 is inclined so that the water outlet position is lower than the front.

Further, an inclination sensor (not shown), which detects a longitudinal inclination angle θ of the fuel cell 10, is mounted in the fuel cell hybrid vehicle S. In this mode, in a case wherein, as shown in FIG. 4A, the rear (the water outlet) of the fuel cell 10 is positioned higher than the front, an inclination angle relative to the horizontal plane of the fuel cell 10 is defined as positive (+θ). Further, in a case wherein, as shown in FIG. 4B, the rear (the water outlet) of the fuel cell 10 is positioned lower than the front, an inclination angle relative to the horizontal plane of the fuel cell 10 is defined as negative (−θ). Information that is detected by the inclination sensor related to the inclination angle θ of the fuel cell 10 is transmitted to the control unit, and is employed for an estimation of the amount of water to be discharged.

As well as in the first mode, the control unit of the fuel cell system according to this mode drives a compressor 24, a shut-off valve 33 and a regulator 34 to supply gas (an oxidizing gas and hydrogen gas) to the fuel cell 10, and thus initiates the performance of "scavenging" to externally remove water from the fuel cell 10.

Furthermore, based on the inclination angle of the fuel cell 10, the control unit estimates the amount of water that is to be discharged from the fuel cell 10 when scavenging is performed. Specifically, the control unit estimates that the amount of water to be discharged will be reduced in the positive inclination angle (+θ) state shown in FIG. 4A, wherein water in the fuel cell 10 is difficult to be discharged externally. On the other hand, the control unit estimates that the amount of water to be discharged will be increased in the negative inclination angle (−θ) state shown in FIG. 4B, wherein water in the fuel cell 10 is easy to be discharged externally. That is, the control unit serves as an example for the discharge amount estimating means according to the present invention.

The control unit for this mode employs a map illustrated in FIG. 5 to perform an estimation of the amount of water to be discharged. For example, in a case wherein the inclination angle of the fuel cell 10 is "$-\theta_3$", based on the map shown in FIG. 5 the amount of water to be discharged from the fuel cell 10 is estimated to be "$Q_{11}$". Likewise, in a case wherein the inclination angle of the fuel cell 10 is "$\theta_3$ ($>-\theta_3$)", the amount of water to be discharged from the fuel cell 10 is estimated to be $Q_{17}$ ($<Q_{11}$)". That is, the control unit estimates that when the inclination angle θ of the fuel cell 10 becomes large (the inclination angle is positive and its absolute value is large), the amount of water to be discharged from the fuel cell will be reduced.

A starting method for the fuel cell system according to this mode will now be described by employing a flowchart in FIG. 6.

Since the operating state of the fuel cell 10 is wet during normal operation of the fuel cell system, water is retained in the fuel cell 10 when the operation is halted. Therefore, in this mode, scavenging should be performed after normal operation was halted and before the fuel cell 10 is started, and at the time scavenging is performed, an estimation of the amount of water to be discharged is made.

That is, first, based on a change in the weight of the fuel cell 10, etc., the control unit of the fuel cell system estimates the amount of water that remains in the fuel cell 10 at the initial control stage (initial residual water amount. e.g., "$W_0$") (initial residual water amount estimating step: S11). Then, the control unit determines whether the initial residual water amount ($W_0$) is smaller than a predetermined permissible value (the amount of residual water whereat the fuel cell 10 can be started) (initial residual water amount determining step: S12). And in a case wherein it is determined that the initial residual water amount ($W_0$) is smaller than the permissible value, the fuel cell 10 is started, without performing scavenging (starting step: S19).

On the other hand, in a case wherein the control unit has determined at the initial residual water amount determining step S12 that the initial residual water amount ($W_0$) is equal to or greater than the permissible value, the control unit employs an inclination sensor to detect the inclination angle of the fuel cell 10 (inclination angle detecting step: S13). Then, based on the map illustrated in FIG. 5, the control unit estimates the amount of water to be discharged, in consonance with the inclination angle obtained at the inclination angle detecting step S13 (discharge amount estimating step: S14). For example, in a case wherein the inclination angle of the fuel cell 10 is "$\theta_2$", the amount of water to be discharged is estimated to be "$Q_{16}$".

Following the discharge estimating step S14, the control unit subtracts the amount of water to be discharged ($Q_{16}$), estimated at the discharge amount estimating step S14, from the initial residual water amount ($W_0$) that was estimated at the initial residual water amount estimating step S11, and obtains a new value for the amount of water remaining in the fuel cell 10 (new residual water amount: "$W_0-Q_{16}$") (new residual water amount calculating step: S15). Sequentially, the control unit determines whether the new residual water amount is smaller than the predetermined permissible value (new residual water amount determining step: S16).

In a case wherein the control unit has determined at the new residual water amount determining step S16 that the new residual water amount is smaller than the permissible value, normal scavenging is performed (normal scavenging step: S17), and the fuel cell 10 is started (starting step: S19). On the other hand, in a case wherein the control unit has determined at the new residual water amount determining step S16 that the new residual water amount is equal to or greater than the permissible value, the control unit performs scavenging at a higher level than normal (higher level scavenging step: S18), and then starts the fuel cell 10 (starting step: S19).

According to the fuel cell system of the above described mode, an accurate amount of water to be externally discharged from the fuel cell 10 can be estimated by taking the state (the inclination angle) of the fuel cell 10 into account, and in a case wherein the external discharging of water in the fuel cell 10 is easy (or difficult) because the fuel cell is inclined, it can be estimated that the amount of water to be discharged from the fuel cell 10 will be increased (or reduced). Therefore, since the moisture condition of the fuel cell 10 can be accurately determined, this can contribute to an improvement in the starting function of the fuel cell 10 in a low-temperature environment, and also, the performance of unnecessary scavenging can be prevented and the amount of fuel (hydrogen gas) that is consumed can be reduced.

Furthermore, since the fuel cell hybrid vehicle S (mobile article) according to the above described mode includes the fuel cell system that can accurately estimate, based on the state of the fuel cell 10, the amount of water to be discharged from the fuel cell 10, a superior starting function can be exhibited in a low-temperature environment, and also the amount of fuel consumed can be reduced.

It should be noted that an example wherein the amount of water discharged from the fuel cell 10 is estimated in accordance with the inclination angle of the fuel cell 10 has been employed for the second mode, and the amount of discharged water can also be estimated based on the state of a force exerted on the fuel cell 10. For example, in a case wherein, since the fuel cell hybrid vehicle S is suddenly accelerated (decelerated), a rearward (forward) inertial force is exerted on the fuel cell 10 that causes water in the fuel cell 10 to be easy (difficult) to discharge to the outside, it can be estimated that the amount of water to be discharged from the fuel cell 10 will be increased (reduced). At this time, a map representing a relationship between the inertial force exerted on the fuel cell 10 and the amount of water discharged is prepared in advance, and the amount of water to be discharged can be estimated based on this map.

INDUSTRIAL APPLICABILITY

As described in the above modes, the fuel cell system according to the present invention can be mounted in fuel cell hybrid vehicles, and also to various types of mobile articles (robots, vessels, air planes, etc.) other than fuel cell hybrid vehicles. Further, the fuel cell system of this invention may also be applied for a stationary power generating system that is used as power generating equipment for buildings (houses, office buildings, etc.).

The invention claimed is:

1. A fuel cell system, comprising:
a fuel cell of a vehicle mounted type for generating electric power;
a control unit for performing scavenging, to supply gas to the fuel cell, and to thus discharge to the outside water in the fuel cell; and
a discharge amount estimating device for, based on the state of the fuel cell, estimating an amount of water to be discharged from the fuel cell,
wherein the control unit is programmed to perform scavenging before the start of the vehicle, and is programmed to subtract, from an initial amount of water remaining in the fuel cell, the amount of water to be discharged that is estimated by the discharge amount estimating device, thus obtaining the amount of water remaining in the fuel cell at the start of a vehicle, and is further programmed to determine different degrees of scavenging based on the amount of water remaining obtained at the start of the vehicle and accordingly change scavenging control based on the amount of water remaining obtained at the start of the vehicle,
wherein the discharge amount estimating device is programmed to estimate the amount of water to be discharged from the fuel cell due to performing scavenging, and is further programmed to estimate the amount of water to be discharged from the fuel cell based on the amount of water remaining in the fuel cell, and
wherein the control unit is programmed to perform scavenging at a higher level than normal when the amount of water remaining obtained at the start of the vehicle is equal to or greater than a permissible value.

2. A mobile article comprising a fuel cell system according to claim 1.

3. The fuel cell system according to claim 1, wherein the discharge amount estimating device is programmed to estimate that the amount of water to be discharged from the fuel cell is increased as there is a large amount of water remaining in the fuel cell.

4. The fuel cell system according to claim 1, wherein the control unit is programmed to perform scavenging in a case wherein the initial amount of residual water is equal to or greater than a permissible value, and the control unit is further programmed not to perform scavenging in a case wherein the initial amount of residual water is smaller than the permissible value.

5. The fuel cell system according to claim 1, wherein the control unit is programmed to perform normal scavenging in a case wherein the obtained amount of residual water is smaller than a permissible value, and the control unit is further programmed to perform higher level scavenging in a case wherein the obtained amount of residual water is equal to or greater that than the permissible value.

6. A fuel cell system, comprising:
a fuel cell of a vehicle mounted type for generating electric power,
a control unit for performing scavenging to supply gas to the fuel cell, and to thus discharge to the outside water in the fuel cell, and
a discharge amount estimating device for, based on a state of the fuel cell, estimating an amount of water to be discharged from the fuel cell,
wherein the control unit is programmed to perform scavenging before the start of the vehicle, and is programmed to subtract from an initial amount of water remaining in the fuel cell, the amount of water to be discharged that is estimated by the discharge amount estimating device, thus obtaining the amount of water remaining in the fuel cell at the start of a vehicle, and is further programmed to determine different degrees of scavenging based on the amount of water remaining obtained at the start of the vehicle and accordingly change scavenging control based on the amount of water remaining obtained at the start of the vehicle, and
wherein the discharge amount estimating device is programmed to estimate the amount of water to be discharged from the fuel cell due to performing scavenging, and is further programmed to estimate the amount of water to be discharged from the fuel cell based on a state wherein the fuel cell is inclined, and
wherein the control unit is programmed to perform scavenging at a higher level than normal when the amount of water remaining obtained at the start of the vehicle is equal to or greater than a permissible value.

7. The fuel cell system according to claim 6, wherein the control unit is programmed to perform scavenging in a case wherein the initial amount of residual water is equal to or greater than a permissible value, and the control unit is further programmed not to perform scavenging in a case wherein the initial amount of residual water is smaller than the permissible value.

8. The fuel cell system according to claim 6, wherein the control unit is programmed to perform normal scavenging in a case wherein the obtained amount of residual water is smaller than a permissible value, and the control unit is further programmed to perform higher level scavenging in a case wherein the obtained amount of residual water is equal to or greater that than the permissible value.

9. A mobile article comprising a fuel cell system according to claim 6.

* * * * *